United States Patent
Hiratsuka (10) Patent No.: US 12,498,425 B2
(45) Date of Patent: Dec. 16, 2025

(54) POWER SUPPLY DEVICE AND BATTERY DETERIORATION DEGREE DETERMINATION SYSTEM

(71) Applicant: MIRAI-LABO KABUSHIKI KAISHA, Hachioji (JP)

(72) Inventor: Toshio Hiratsuka, Hachioji (JP)

(73) Assignee: MIRAI-LABO KABUSHIKI KAISHA, Hachioji (JP)

( * ) Notice: Subject to any disclaimer, the term of this patent is extended or adjusted under 35 U.S.C. 154(b) by 164 days.

(21) Appl. No.: 18/287,764

(22) PCT Filed: Mar. 29, 2022

(86) PCT No.: PCT/JP2022/015729
§ 371 (c)(1),
(2) Date: Oct. 20, 2023

(87) PCT Pub. No.: WO2022/239558
PCT Pub. Date: Nov. 17, 2022

(65) Prior Publication Data
US 2024/0192282 A1    Jun. 13, 2024

(30) Foreign Application Priority Data
May 14, 2021   (JP) .................................. 2021-082813

(51) Int. Cl.
*G01R 31/392* (2019.01)
*G01R 31/396* (2019.01)
(Continued)

(52) U.S. Cl.
CPC ......... *G01R 31/392* (2019.01); *G01R 31/396* (2019.01); *H01M 10/441* (2013.01);
(Continued)

(58) Field of Classification Search
CPC ..... G01R 31/392; G01R 31/396; H02J 7/005; H02J 7/0014; H02J 7/35; H01M 10/441;
(Continued)

(56) References Cited

U.S. PATENT DOCUMENTS 11,322,946 B2 * 5/2022 Yeom ...................... B60L 53/62
12,427,890 B2 * 9/2025 Ryu ...................... G01R 31/392
(Continued)

FOREIGN PATENT DOCUMENTS

JP   2005-176461 A   6/2005
JP   2012-220199 A   11/2012
(Continued)

OTHER PUBLICATIONS

"Aucnet and Mirai-Labo Begin Entry into the Recycling and Distribution Business of Used EV Batteries," Mirai Labo, Feb. 8, 2021, 12 pages including machine English translation.
(Continued)

*Primary Examiner* — Huy Q Phan
*Assistant Examiner* — Trung Q Nguyen
(74) *Attorney, Agent, or Firm* — Troutman Pepper Locke LLP (57) ABSTRACT

To provide a power supply device and a battery deterioration degree determination system that enables continuous use of stable electric power even if used battery cells of various deterioration degrees are used. A power supply device for performing charging from a charging part and discharging from a discharging part includes plural battery units including plural battery cells connected in series or in parallel, a connection selection part configured to select at least one of the battery units to be connected to the charging part or the discharging part, an accommodation part configured to detachably accommodate each of the battery units. The battery cells are classified into plural deterioration ranks
(Continued)

according to a deterioration degree, and the battery cells included in one of the battery units have the same deterioration rank.

16 Claims, 9 Drawing Sheets (51) Int. Cl.
  *H01M 10/44* (2006.01)
  *H01M 10/46* (2006.01)
  *H01M 10/48* (2006.01)
  *H02J 7/00* (2006.01)
  *H02J 7/35* (2006.01)
(52) U.S. Cl.
  CPC ....... *H01M 10/465* (2013.01); *H01M 10/482* (2013.01); *H02J 7/0014* (2013.01); *H02J 7/005* (2020.01); *H02J 7/35* (2013.01); *H01M 2220/20* (2013.01)
(58) Field of Classification Search
  CPC ............. H01M 10/465; H01M 10/482; H01M 2220/20
  USPC .............................. 324/500, 600, 76.11, 434
  See application file for complete search history.

(56) References Cited

U.S. PATENT DOCUMENTS

| 2005/0121979 | A1 |  | 6/2005 | Matsumoto et al. |
| 2015/0355287 | A1 | * | 12/2015 | Murase ................ G01R 31/386 324/434 |
| 2020/0364661 | A1 |  | 11/2020 | Yamasaki |
| 2021/0001744 | A1 |  | 1/2021 | Suzuki |
| 2021/0265850 | A1 | * | 8/2021 | Okino .................. G01R 31/392 |
| 2022/0146590 | A1 |  | 5/2022 | Asai et al. |
| 2023/0104680 | A1 | * | 4/2023 | Furukawa .......... G05B 23/0283 714/14 |
| 2023/0184836 | A1 | * | 6/2023 | Kazumi ............. H01M 10/052 702/63 |
| 2023/0286398 | A1 | * | 9/2023 | Agatsuma .............. G06Q 10/20 |
| 2023/0286405 | A1 |  | 9/2023 | Suzuki |

FOREIGN PATENT DOCUMENTS

| JP | 2015121520 | A | 7/2015 |
| JP | 2018-092856 | A | 6/2018 |
| JP | 2018-139471 | A | 9/2018 |
| JP | 2020-112491 | A | 7/2020 |
| JP | 2020-149679 | A | 9/2020 |
| JP | 2020-187539 | A | 11/2020 |
| JP | 2021-027031 | A | 2/2021 |
| WO | 2020/004509 | A1 | 1/2020 |

OTHER PUBLICATIONS

"Aucnet Begins Entry into the Recycling and Distribution Business of Mirai-Labo Used EV Batteries," Feb. 8, 2021, Mirai Labo web news, 26 pages including machine English translation.

"Aucnet and Mirai-Labo Begin Entry into Used EV Battery Recycling and Distribution Business," Feb. 8, 2021, Mirai Labo web news, 8 pages including machine English translation.

English Translation of International Search Report mailed Jun. 14, 2022, issued for PCT/JP2022/015729.

Japan Patent Office, Notice of Reasons for Refusal issued on Jun. 4, 2024, in corresponding Japanese atent Application No. 2023-185756.

* cited by examiner

POWER SUPPLY DEVICE AND BATTERY DETERIORATION DEGREE DETERMINATION SYSTEM

TECHNICAL FIELD

The present invention relates to a power supply device and a battery deterioration degree determination system, and more particularly, to a power supply device and a battery deterioration degree determination system capable of replacing plural battery units.

BACKGROUND ART

In recent years, there is a growing use of electric objects, hybrid cars, and electric motorcycles using electric power as a power source for mobile objects (e.g., automobiles, motorcycles) and converting the power supplied from a secondary battery into kinetic energy. Further, the adoption rate of power-assisted bicycles using electric power as an auxiliary power source of the bicycle is also increasing.

Because these mobile objects use the electric power stored in the secondary battery mounted on the mobile objects, their travel distance is determined by the chargeable capacity of the secondary battery. In order to increase the travel distance of the mobile object, it is effective to increase the capacity by increasing the size of the secondary battery. However, it is known that the chargeable capacity of the secondary battery deteriorates according to its used environment and its use history. Further, the travel distance of the mobile object gradually becomes shorter in comparison with the travel distance of a brand new secondary battery.

Thus, it is proposed to individually measure the degree of deterioration of secondaries batteries and replace a secondary battery whose deterioration has progressed more than a predetermined degree with a new secondary battery, so that the travel distance of the mobile object can be maintained. Further, it is also proposed that a deteriorated secondary battery be collected by a collector company and reused as a reusable product or a rebuilt product after it has been subject to performance recovery and reassembly (For example, see Patent Document 1).

Figure 9:
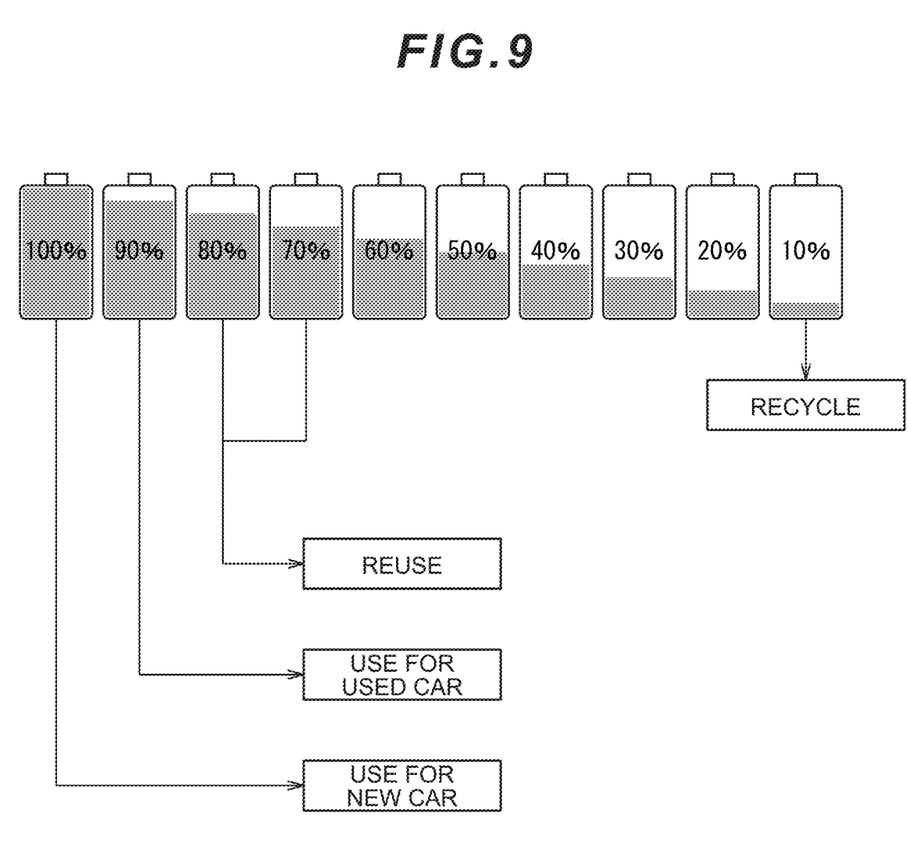
FIG. 9 is a schematic diagram illustrating a conventionally proposed model of collecting a secondary battery.

FIG. 9 is a schematic diagram illustrating a conventionally proposed model for collecting a secondary battery. In this drawing, the proportion of a chargeable capacity of a battery cell compared to that of a new battery cell is illustrated in percentages. In other words, assuming that the chargeable capacity at the time of a new product is indicated as 100% (deterioration degree of 0%), deterioration degree would be 100%−(chargeable capacity %).

In the example illustrated in FIG. 9, a battery cell with a chargeable capacity of 100% can be used in new cars, and a battery cell with a chargeable of 90% (deterioration degree of 10%) is used for used cars or sold as a used secondary battery. Further, a battery cell with a chargeable capacity of 70-80% (deterioration level of 20-30%) is used for applications other than mobile objects, such as a power supply for a streetlight because it is difficult to ensure a sufficient travel distance compared to a new battery. Further, because it is difficult for a battery cell whose chargeable capacity has deteriorated to approximately 10% (deterioration degree of 90%) to be reused in other applications, they are disassembled and have their raw materials recycled.

As described above, with the conventional art, a battery cell whose deterioration has not progressed substantially can be reused whereas a battery cell whose deterioration is significant can be recycled. Thereby, resources can be efficiently used.

RELATED ART DOCUMENTS

Patent Documents

Patent Document 1: Japanese Laid-Open Patent Publication No. 2020-149679

SUMMARY OF THE INVENTION

Problem to be Solved by the Invention

However, with the conventional art, it is difficult to maintain a chargeable capacity with respect to those having a chargeable capacity of approximately 20% to 60% (deterioration degree of 40% to 80%) because deterioration progresses even in reuse. Thus, it is a problem that the application for reuse is limited. In addition, when deterioration of a reused battery cell further progresses, the deterioration degree eventually becomes 90% or more, and it becomes impossible to use the battery cell even for applying it for reuse. Thus, difficulty in attaining a stable power supply is also a problem.

However, the present invention is provided in view of the above-described conventional problem and aims to provide a power supply device and a battery deterioration degree determination system that enables continuous use of a stable power supply even in a case of using used battery cells of various deterioration degrees.

Means for Solving the Problem

In order to solve the above-mentioned problems, the power supply device of the present invention is characterized in that a power supply device for performing charging from a charging part and discharging from a discharging part includes plural battery units including plural battery cells connected in series or in parallel, a connection selection part configured to select at least one of the battery units to connected to the charging part or the discharging part, an accommodation part configured to detachably accommodate each of the battery units, wherein the battery cells are classified into plural deterioration ranks according to a deterioration degree, and the battery cells included in one of the battery units have the same deterioration rank.

With the power supply device of the present invention, because the battery cells included in the battery unit have the same deterioration rank, each battery unit can be appropriately used in charging and discharging even if battery cells having different deterioration degrees are used. This enables continuous use of stable electric power even if used battery cells of various deterioration degrees are used.

Further, according to one aspect of the present invention, there is further included a deterioration measurement part configured to measure the deterioration degree of the battery cells included in the battery unit, and a unit replacement notification part configured to transmit a unit replacement signal based on a measurement result of the deterioration measurement part.

Further, according to one aspect of the present invention, the unit replacement notification part is configured to transmit the unit replacement signal in a case where a charge capacity of any one of the battery cells is equal to or less than a first threshold value.

Further, according to one aspect of the present invention, the connection selection part is configured to exclude the battery unit included in the battery cell having a charging capacity equal to or less than the first threshold value from a selection target.

Further, according to one aspect of the present invention, the unit replacement notification part is configured to calculate a sum of a chargeable amount of electricity of plural the battery units accommodated in the accommodation part as a total charge amount, and transmit the unit replacement signal in a case where the total charge amount is equal to or less than a second threshold value.

Further, according to one aspect of the present invention, the deterioration measurement unit is configured to measure the deterioration degree based on electrical characteristics at a time of charging or discharging of the battery unit.

Further, according to one aspect of the present invention, a photovoltaic power generating part for generating electricity by light is connected to the charging part.

In order to solve the above-mentioned problems, a battery deterioration degree determination system for determining deterioration of a used battery element is characterized in that the battery deterioration degree determination system includes a management server configured to record identification data of the battery element in association with usage history data, and a deterioration determination part configured to measure a first electrical characteristic at a time of charging or discharging of the battery element, determine a first deterioration degree based on a measurement result of the first electrical characteristic and the usage history data, and record the identification data in association with diagnosis data including the first deterioration degree in the management server.

With the battery deterioration degree determination system according to the present invention, by determining the deterioration degree based on the electrical characteristics and the usage history data of the battery element, accurate determination of the deterioration degree can be achieved by considering not only the status of the battery element at the time of measurement of the electrical characteristics but also considering the usage history from the time of the manufacturing of the battery element.

Further, according to one aspect of the present invention, the deterioration determination part is configured to measure a second electrical characteristic at a time of charging or discharging of the battery element after a lapse of a predetermined period, update the usage history data, determine a second deterioration degree based on a measurement result of the second electrical characteristic and the usage history data, and update the diagnosis data by adding the second deterioration degree to the diagnosis data.

Further, according to one aspect of the present invention, the deterioration determination part is configured to analyze a relation between the usage history data and the diagnosis data regarding plural battery elements by machine learning, and update a method for determining the first deterioration degree and the second deterioration degree based on a result of the analysis.

Effects of the Invention

According to the present invention, it is possible to provide a power supply device that enables continuous use of stable electric power even in a case of using used battery cells of various deterioration degrees.

MODES FOR CARRYING OUT THE INVENTION

First Embodiment

Figure 1:
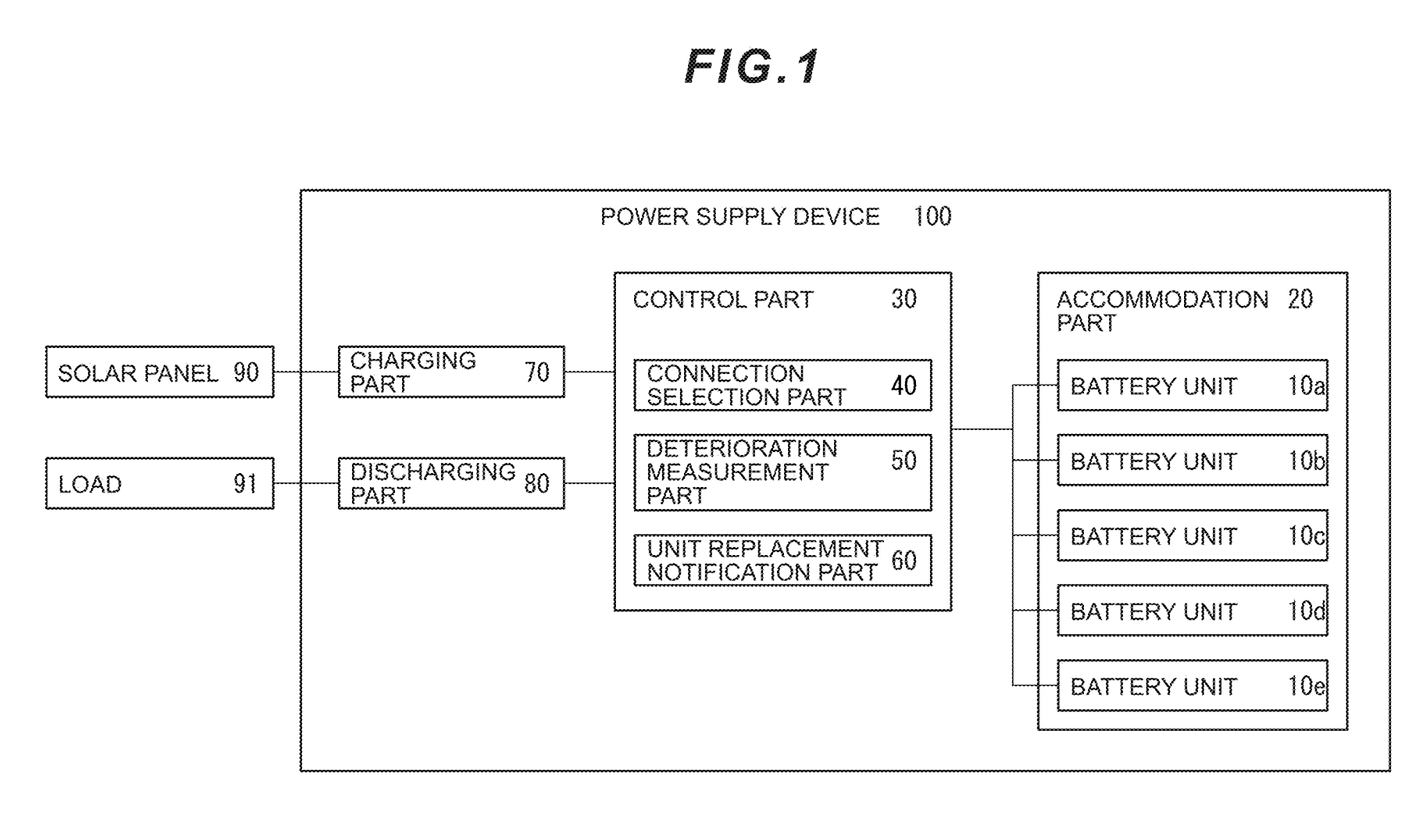
FIG. 1 is a block diagram schematically illustrating a configuration of a power supply device 100 according to the first embodiment.

Hereinafter, embodiments of the present invention will be described in detail with reference to the drawings. The same or equivalent components, members, and processes illustrated in the respective drawings are denoted by the same reference numerals, and duplicate descriptions are omitted as appropriate. FIG. 1 is a block diagram schematically illustrating a configuration of a power supply device 100 according to this embodiment. As illustrated in FIG. 1, the power supply device 100 includes plural battery units 10a-10e, an accommodation part 20, a control part 30, a connection selection part 40, a deterioration measurement part 50, a unit replacement notification part 60, a charging part 70, and a discharging part 80. Further, a solar panel 90 is connected to the charging part 70, and a load 91 is connected to the discharging part 80.

Each battery unit 10a-10e is a secondary battery in which plural battery cells are electrically connected. Similar to a publicly known secondary battery, each battery unit 10a-10e includes, for example, a terminal for charging and discharging and a BMS (Battery Management System) for controlling the charging and discharging. As described below, the battery cells included in each battery unit 10a-10e are those obtained by reusing the battery cells included in the secondary batteries that were used in a mobile object or the like. Further, each battery unit 10a-10e has a shape enabling it to be detachably accommodated in the accommodation part 20 and is provided with a structure in which detachment is restricted by a locking mechanism included in the accommodation part 20.

The accommodation part 20 is a part for detachably accommodating and holding plural battery units 10a-10e and regulating the attaching and detaching of the battery units 10a-10e by actuating the locking mechanism. The shape of the accommodation part 20 and the structure of the specific locking mechanism is not limited in particular. Publicly known battery attachment/detachment mechanisms may be used. Further, the accommodation part 20 includes terminals and wires for electrically connecting the battery units 10a-10e and the control part 30. Although FIG. 1 illustrates an example in which five battery units 10a-10e are accommodated in the accommodation part, the number of battery units that are accommodated is not to be limited.

The control part 30 is a part for controlling the operation of the connection selection part 40, the deterioration measurement part 50, and the unit replacement notification part 60. The control part 30 includes a memory (not illustrated) and an external storage device, a central processing unit (CPU: Central Processing Unit) and performs data processing according to a predetermined program to control each part.

The connection selection part 40 is a part for selecting the battery units 10a-10e to be connected to the charging part 70 or the discharging part 80. The connection selection part 40 switches between connection and disconnection between each of the parts mechanically or electronically. For example, in a case where the connection selection part 40 connects the battery unit 10a and the charging part 70 and connects the battery unit 10e and the discharging part 80, the electric power supplied from the solar panel 90 charges the battery unit 10a and the electric power is supplied from the battery unit 10e to the load. Although the specific configuration of the connection selection part 40 is not limited in particular, it is preferable to use a circuit configuration capable of suppressing the instantaneous interruption that stops the supply of power when switching the battery units 10a-10e connected to the discharging part 80.

The deterioration measurement part 50 is a part for acquiring data regarding the battery units 10a-10e connected to the control part 30 and measuring the deterioration degree of the battery cells included in the battery units 10a-10e. Here, assuming that the chargeable capacity in a state where all of the battery cells are brand new is "brand new capacity" whereas the chargeable capacity in a state where the battery cells 10a-10e are reassembled is "deteriorated capacity", the "deterioration degree" is expressed by the ratio between the deteriorated capacity and the brand new capacity.

Further, "chargeable capacity" indicates the amount of electric power that can be extracted from the time when the battery is fully charged to the time when the battery is fully discharged in a case where full charge and full discharge of the battery are set. In other words, with each of the battery units 10a-10e, in a case where a "full charge" (100%) is assumed as a state in which the BMS stops charging by activating an overcharge protection function and a "full discharge" (0%) is assumed as a state in which the BMS stops discharging by activating an overdischarge protection function, the amount of electric power required to charge from "full discharge" (0%) to "full charge" (100%) is the chargeable capacity of each of the battery units 10a-10e.

The deterioration measurement part 50 measures the electrical characteristics of the battery units 10a-10e at the time of charging or discharging of the battery units 10a-10e and calculates the deterioration degree based on the measured electrical characteristics. The specific method for calculating the deterioration degree is not limited in particular. The electrical characteristics that are measured may be, for example, full charge voltage, full discharge voltage, open circuit voltage, closed circuit voltage, charge characteristic, discharge characteristic, internal resistance, temperature characteristic, load characteristic, cyclic usage history data, or impedance.

The unit replacement notification part 60 is a part which transmits a unit replacement signal based on the measurement result of the deterioration measurement part 50. Here, the unit replacement signal is a signal that notifies the battery unit 10a-10e to be replaced to the outside of the power supply device 100. The unit replacement signal is a signal transmitted to a transmission target by using publicly known communication methods. The specific configuration of the unit replacement notification part 60 is not limited in particular. For example, a warning lamp using electrical wiring and a lamp may be used. Alternatively, electronic data communication using a wireless communication method may be used.

The charging part 70 is a part for receiving electric power from an electric power source connected to the power supply device 100. The charging part 70 includes a connection terminal and an electronic circuit. The charging part 70 may include a conversion circuit for converting the current value and the voltage value for charging the battery units 10a-10e. Further, the charging part 70 may include a control circuit for controlling the charging of the battery units 10a-10e. In particular, when using the solar panel 90 as an electric power source, it is preferable to include a circuit for performing pulse-width-modulated (PWM: Pulse Width Modulation) control or maximum-power point tracking (MPPT: Maximum Power Point Tracking) control.

The discharging part 80 is a part for supplying power to the load 91 connected to the power supply device 100. The discharging part 80 includes a connection terminal and an electronic circuit. The discharging part 80 may include a conversion circuit for converting the current value or the voltage value of the power supplied from the battery units 10a-10e. Further, it is preferable to include a DC/AC inverter-circuit when outputting an alternating current to the load 91.

The solar panel 90 is an electric power source that is connected to the charging part 70 and supplies electric power to the power supply device 100. The solar panel 90 receives sunlight and converts light energy into electrical energy. Therefore, the solar panel 90 corresponds to a photovoltaic power generation part in the present invention. Although an example in which the solar panel 90 is used as the electric power source is described, the configuration of the electric power source is not to be limited as long as electric power can be supplied to the power supply device 100 through the charging part 70. For example, a commercial power supply or other electric power generation devices may be used.

The load 91 is a device connected to the discharging part 80 and supplied with electric power from the power supply device 100. The specific configuration of the load 91 is not limited in particular. For example, a lighting device such as a street lamp, an image display device, a wireless communication base station, or a power source such as a pump or a motor may be used. Although this example illustrates the discharging part 80 connected to the load 91, the discharging part 80 may be connected to a power grid to sell electric power to an electric power company.

Figure 2:
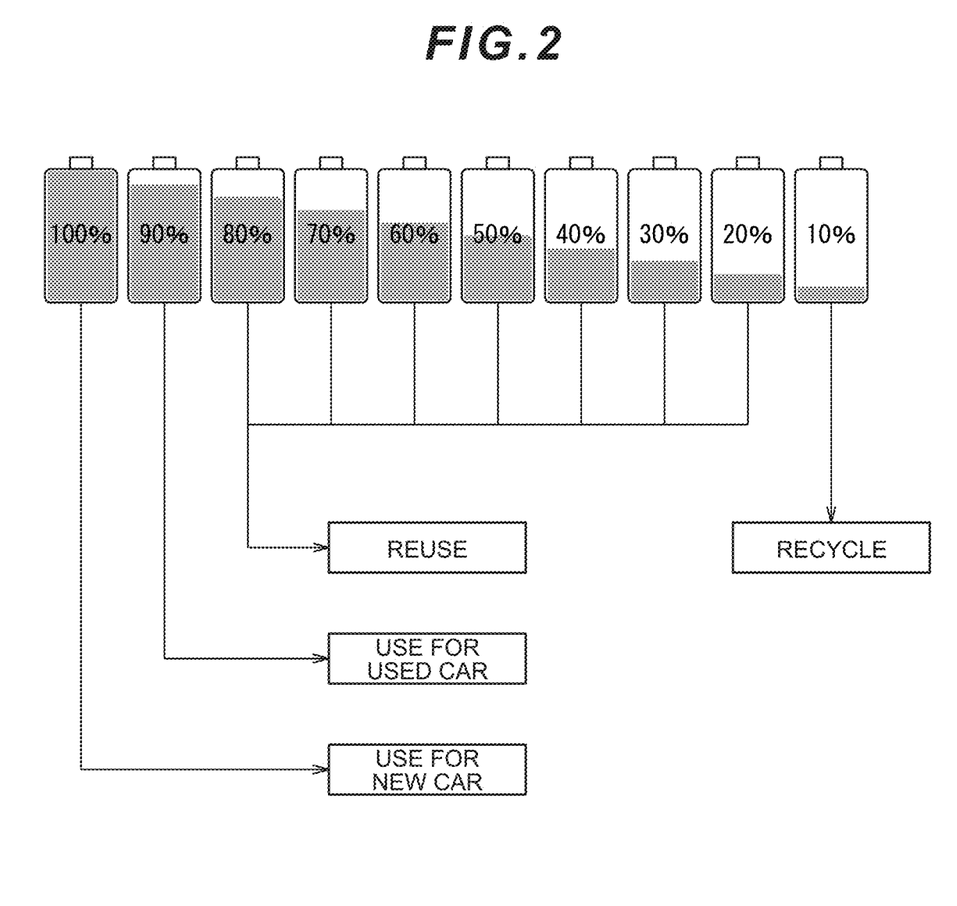
FIG. 2 is a schematic diagram illustrating a model of collecting a secondary battery included in a power supply device 100 according to the first embodiment.

FIG. 2 is a schematic diagram illustrating a model of collecting a secondary battery included in the power supply device 100 according to this embodiment. In the embodiment illustrated in FIG. 2, deterioration degree is calculated by measuring the electrical characteristics of the battery cells included in a collected secondary battery. A battery cell with a chargeable capacity of 20% to 80% (deterioration degree of 20% to 80%) is reused and reassembled into the battery units 10a-10e. Here, the method for calculating the deterioration degree at the time of collecting the secondary battery is not limited in particular. However, it is preferable to derive a result equivalent to the result of the calculation of deterioration degree by the deterioration measurement part 50, and preferable to perform the same measurement of electrical characteristics and calculation of deterioration degree as those of the deterioration measurement part 50. Similar to before, battery cells with 100% chargeable capacity will be used in new cars, and battery cells with 90% chargeable capacity (deterioration degree of 10%) will be used in used cars or sold as used secondary batteries. Further, battery cells with a chargeable capacity of approximately 10% (deterioration degree of 90%) are disassembled and sent to have their raw materials recycled.

Figure 3:
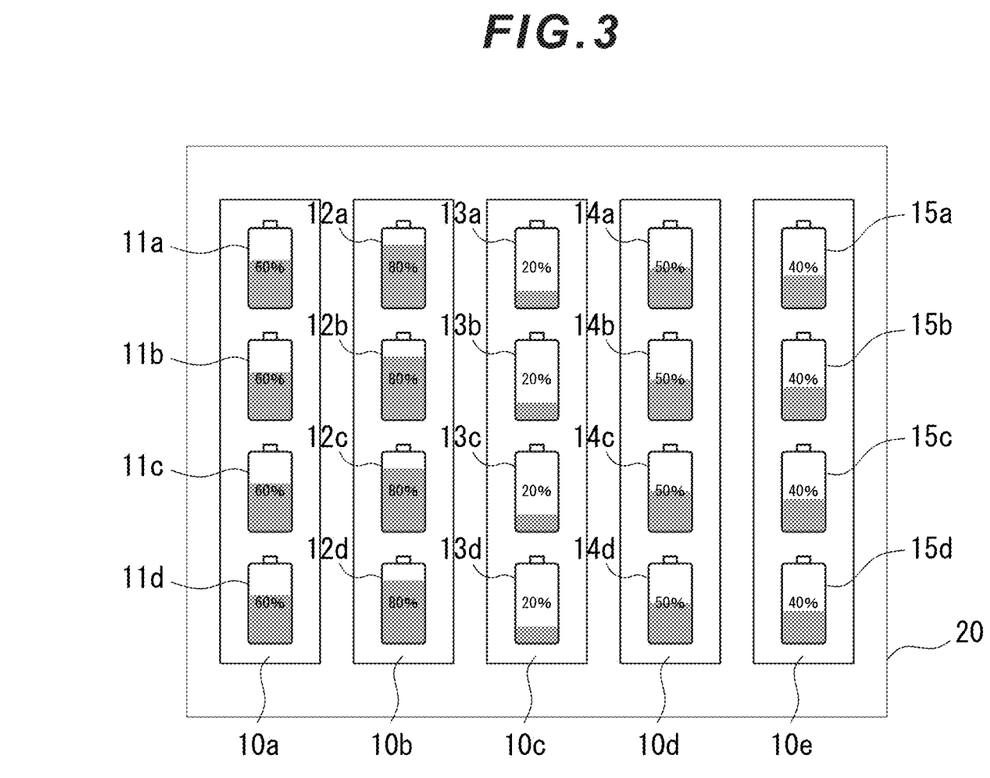
FIG. 3 is a schematic diagram illustrating a battery cell included in battery units 10a-10e.

FIG. 3 is a schematic diagram illustrating battery cells included in the battery units 10a-10e. As illustrated in FIG. 3, each battery unit 10a-10e includes plural battery cells 11a-11d, 12a-12d, 13a-13d, 14a-14d, 15a-15d. Each of the battery cells 11-15 is connected in series or in parallel. The number of battery cells 11-15 included in each battery unit 10a-10e is the same, and the connection relation of the battery cells inside the battery units 10a-10e is the same.

Further, in a case where the battery cells 11-15 having different deterioration degrees are connected in series or in parallel, the characteristics of the battery units 10a-10e would be affected by the electrical characteristics of the most deteriorated battery cell among the battery cells 11-15. Thus, it would be difficult to utilize the chargeable capacity in correspondence with the deterioration degree of each of the battery cells 11-15. However, in this embodiment, although the deterioration degrees of the battery cells 11-15 included in the battery units 10a-10e are different, the ranks of the deterioration degree (deterioration ranks) of the battery cells 11-15 included in one battery unit 10a-10e are the same. Here, the "deterioration rank" represents a classification that is ranked according to the deterioration degree. The rank may be assigned by, for example, rounding a first digit of a percentage.

In the embodiment illustrated in FIG. 3, the battery cells 11a-11d included in the battery unit 10a have a chargeable capacity of 60% (rank of 40% deterioration degree), the battery cells 12a-12d included in the battery unit 10b have a chargeable capacity of 80% (rank of 20% deterioration degree), the battery cells 13a-13d included in the battery unit 10c have a chargeable capacity of 20% (rank of 80% deterioration degree), the battery cells 14a-14d included in the battery unit 10d have a chargeable capacity of 50% (rank of 50% deterioration degree), and the battery cells 15a-15d included in the battery unit 10e have a chargeable capacity of 40% (rank of 60% deterioration degree).

Accordingly, effective utilization of the chargeable capacities corresponding to the respective electrical characteristics of each of the battery units 10a-10e can be achieved by classifying the battery cells 11-15 according to the deterioration rank and reassembling the battery units 10a-10e only with the battery cells 11-15 having the same deterioration rank. In the embodiment illustrated in FIG. 3, since the four battery cells 11a-11d included in the battery unit 10a have a rank of 60% deterioration degree, the chargeable capacity of the entire battery unit 10a is approximately four times greater than the chargeable capacity of each of the battery cells 11a-11d. This similarly applies to the other battery units 10b-10e.

Therefore, the chargeable capacity of the battery units 10a-10e can be determined according to the deterioration degree of the respective battery cells 11a-11d. Further, the sum of the chargeable electric amount of the battery units 10a-10e accommodated in the accommodation part 20 can be calculated as a total charge amount. According to the embodiment illustrated in FIG. 3, in a case where the chargeable electric amount (capacity) of a single brand new battery cell is 1 kWh, the chargeable electric amount of the battery unit 10a is 1×0.6×4=2.4 kWh. Similarly, the chargeable electric amount of the battery units 10b-10e would each be 3.2 kWh, 0.8 kWh, 2 kWh, 1.6 kWh, and the entire power supply device 100 would be able to charge 10 kWh.

As described above, the chargeable capacity of the power supply device 100 (total charge amount) is the sum of the chargeable capacities of the battery units 10a-10e accommodated in the accommodation part 20. Accordingly, by appropriately combining the battery units 10a-10e of various chargeable capacities, the total charge amount of the power supply 100 can be determined. Thus, even if a battery unit uses a battery cell having a deterioration rank indicating progressed deterioration, the battery unit can be used in combination with another battery unit using a battery cell having a deterioration rank indicating a low deterioration degree, so that the power supply device 100 can attain a desired total charge amount.

Figure 4:
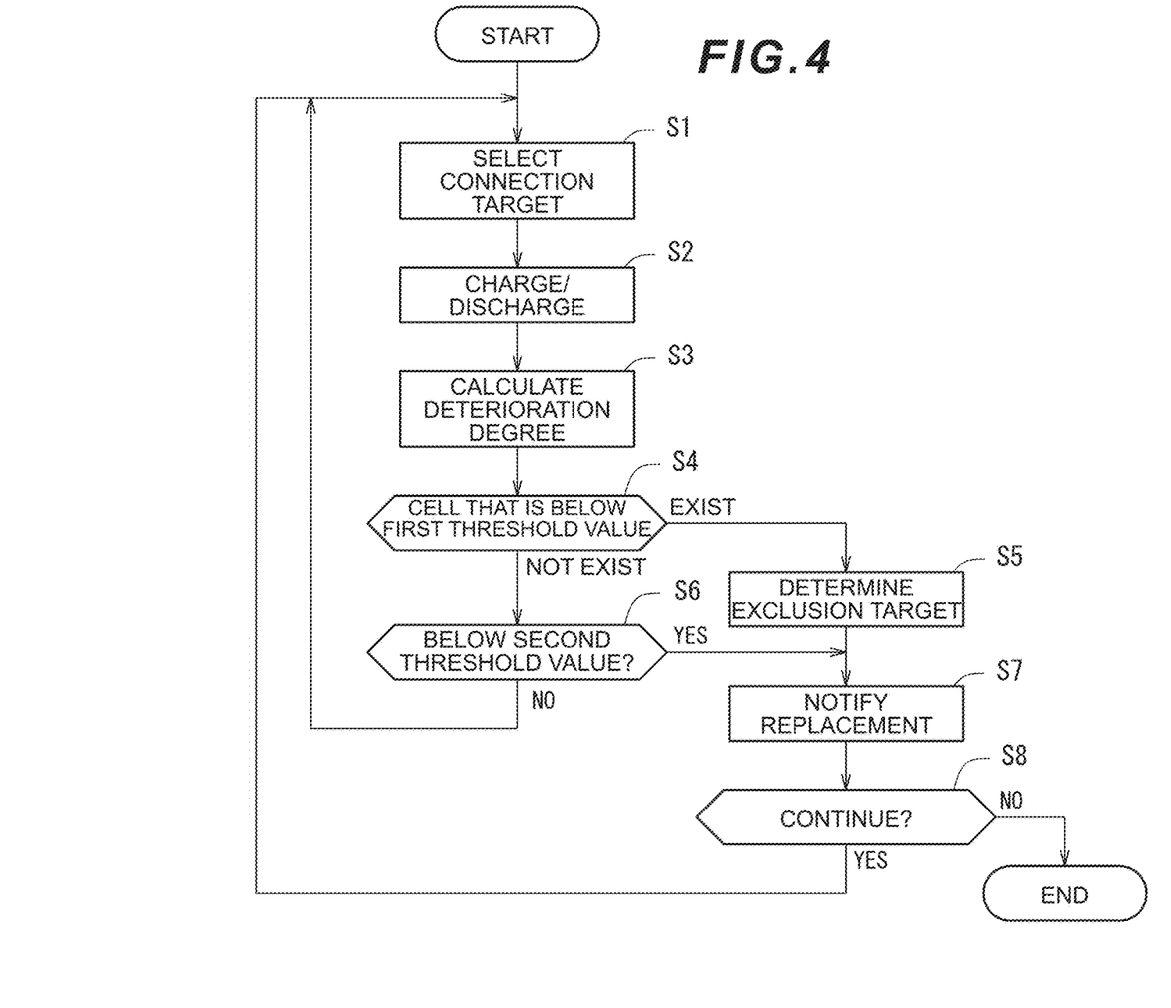
FIG. 4 is a flow chart illustrating a procedure for managing battery units 10a-10e in a power supply device 100.

FIG. 4 is a flow chart illustrating a procedure for managing the battery units 10a-10e of the power supply device 100. When the driving of the power supply device 100 is started, the control part 30 reads a program from a storage device into a memory and executes the following steps starting from step S1. Here, although the program is read from the storage device provided in the power supply device 100, it may be a program downloaded via a network.

Step S1 is a connection-target selection step for selecting a battery unit 10a-10e to be charged or discharged. The control part 30 acquires data from the BMS regarding the battery units 10a-10e accommodated in the accommodation part 20 and selects a target to be charged and discharged according to a predetermined order of priorities for charging and discharging. Further, the connection selection part 40 electrically connects the selected target among the battery units 10a-10e with the charging part 70 or the discharging part 80 and disconnects the electrical connection with the unselected battery units 10a-10e. After selecting the charge/discharge target and performing connection/disconnection, the procedure proceeds to step S2.

Step S2 is a charging/discharging step for performing a charging operation on the selected charging target of the battery units 10a-10e from the charging part 70 and discharging from the discharging target of the battery units 10a-10e via the discharging part 80. The specific charging and discharging operations performed by the charging part 70 and the discharging part 80 are not limited in particular. Publicly known circuit configurations and controlling methods may be used. The procedure proceeds to step S3 while continuing the charging/discharging operations with the charging part 70 and the discharging part 80.

Step S3 is a deterioration degree calculation step for calculating the deterioration degrees of the battery cells 11-15 included in the respective battery unit 10a-10e. In the power supply device 100, deterioration of the battery cells 11-15 further progresses by performing the charging operation or the discharging operation in step S2. In the deterioration degree calculation step, the deterioration measurement part 50 measures the electrical characteristics at the time of the charging operation or the discharging operation of the battery units 10a-10e selected as the charging target or the discharging target and calculates the deterioration degree based on the measured electrical characteristics. After the deterioration measurement part 50 calculates the deterioration degrees, the procedure proceeds to step S4.

Step S4 is a unit deterioration determination step in which the battery cells 10a-10e of the battery units to be excluded from charge/discharge are determined based on the deterioration degrees of the battery cells 11-15 of the battery units 10a-10e calculated in the deterioration degree calculation step. The control part 30 compares the chargeable electric amounts (charge capacity) obtained from the deterioration degrees of the battery cells 11-15 calculated by the deterioration measurement part 50 with a predetermined determination criterion and determines whether the battery units 10a-10e correspond to an exclusion target. If a battery unit 10a-10e corresponding to the exclusion target exists, the procedure proceeds to step S5, and if it does not exist, the procedure proceeds to step S6. In the example illustrated in FIG. 4, a threshold value of the charge capacity (first threshold value) is determined beforehand as the determination criterion. The criterion is whether the charge capacity of any of the battery cells 11-15 is equal to or less than the first threshold value. As an example, the first threshold value may be assumed to be 10% (deterioration degree of 90% or more) of the charge capacity at the time of a brand new state.

Step S5 is an exclusion target determination step in which the battery unit 10a-10e determined to correspond to an exclusion target in the unit deterioration determination step is excluded from the targets to be subject to the charging operation and the discharging operation. The control part 30 records that the battery unit 10a-10e determined as the exclusion target in the unit deterioration determination step is the exclusion target in the storage device and excludes the battery unit from the targets to be selected for charging operation and discharging operation in the subsequent connection target selection step. After the control part 30 records the exclusion target, the procedure proceeds to step S7.

Step S6 is a total charge amount determination step for determining whether the chargeable electric amount (total charge amount) of the entire power supply device 100 is maintained. The control part 30 calculates the total charge amount of the battery units 10a-10e accommodated in the accommodation part 20 based on the deterioration degrees of the battery cells 11-15 of the battery units 10a-10e calculated in the deterioration degree calculation step. In a case where the calculated total charge amount is lower than a predetermined threshold value (second threshold value), the procedure proceeds to step S7. In a case other than the aforementioned case, the procedure proceeds to step S1.

Step S7 is a replacement notification step for prompting replacement of the battery units 10a-10e. The unit replacement notification part 60 transmits a unit replacement signal to the outside of the power supply device 100 to indicate that a battery unit 10a-10e selected as an exclusion target in the unit deterioration determination step exists or that the total charge amount is below the second threshold value. At the same time, it is notified which battery unit 10a-10e is excluded as the exclusion target, and a battery unit having the greatest deterioration and low charge capacity is notified to be a replacement target. Further, the battery unit 10a-10e notified as the replacement target is excluded from the charging/discharging targets for the charging/discharging operations. In addition, the locking mechanism of the accommodation part 20 is released, so that the battery unit 10a-10e notified as the replacement target can be removed.

A collector company receiving the unit replacement signal newly prepares a reassembled battery unit 10, takes out the battery unit 10a-10e to be replaced from the accommodation part 20, and replaces it with the newly prepared battery unit 10. After the unit replacement notification part 60 transmits the unit replacement signal, the procedure proceeds to step S8.

Step S8 is a continuation determination step for determining whether to continue the charging and discharging operations. The control part 30 determines whether to continue the charging and discharging operations based on, for example, the power supplied from the electric power source connected to the charging part 70 and the connection status of the load 91. In a case where it is determined to be continued, the procedure proceeds to step S1. In a case where it is determined to not be continued, the control operation is terminated.

Figure 5:
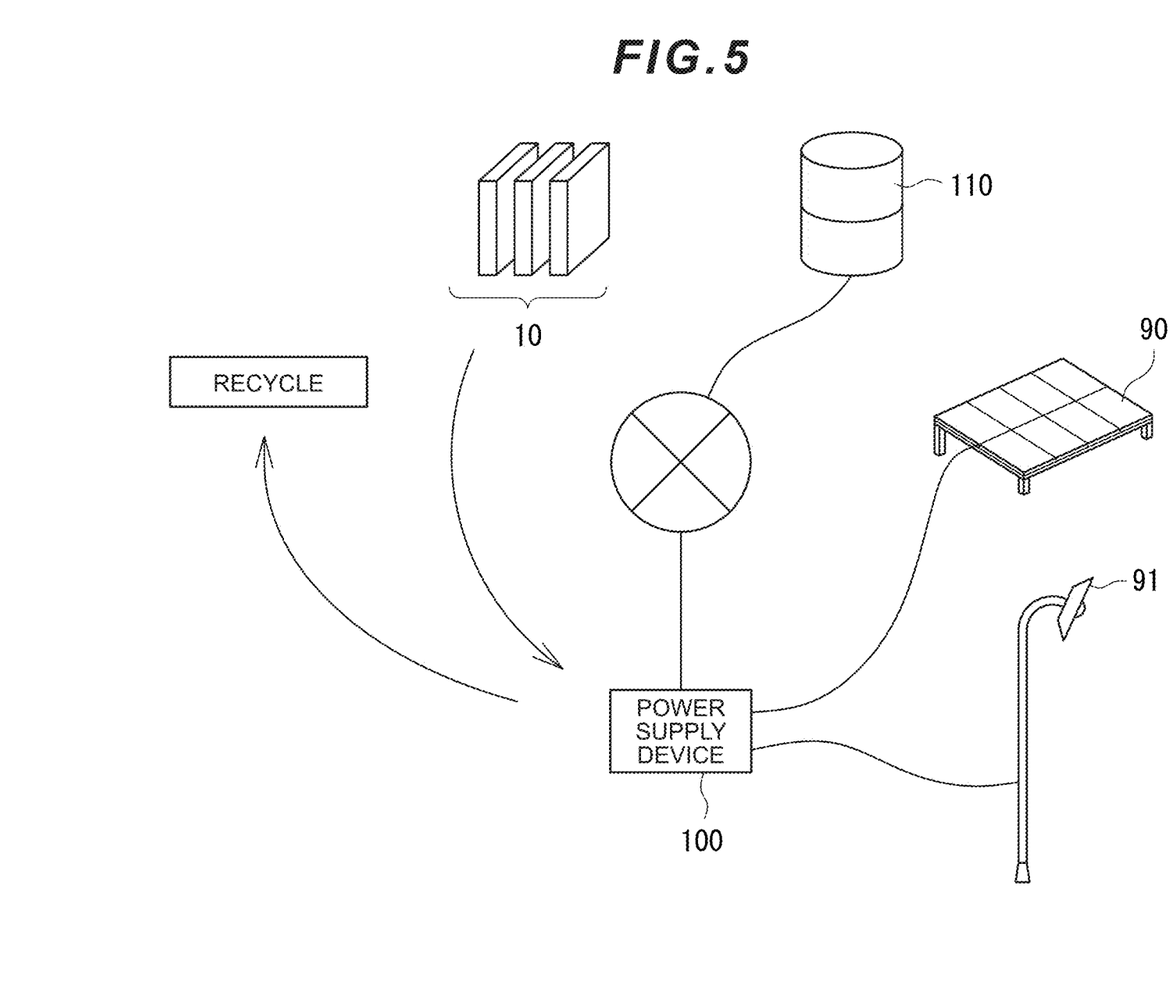
FIG. 5 Is a schematic diagram illustrating an example of a power supply system using a power supply device 100.

FIG. 5 is a schematic diagram illustrating an example of a power supply system using the power supply device 100. In the power supply device 100, the solar panel 90 serving as the electric power source is connected to the charging part 70, and a lighting device is connected as the load 91 to the discharging part 80. Further, the power supply device 100 is data-communicably connected to the management server 110 via a network. With the power supply system as illustrated in FIG. 5, the power supply device 100 can be charged by electric power generated in the solar panel 90 and the load 91 can be driven by the electric power charged in the power supply device 100 even in remote areas where securing a commercial power supply is difficult.

The management server 110 is a data processing device operated by a collector company that collects secondary batteries and reassembles the battery unit 10. The management server 110 receives the unit replacement signal transmitted by the unit replacement notification part 60 via a network. The collector company receiving the unit replacement signal removes and retrieves the battery unit 10a-10e determined as the replacement target. Further, the collector company disassembles the retrieved battery unit and sends it for recycling its raw material. Further, the newly prepared battery unit 10 is accommodated in the accommodation part 20 to be subject to charging and discharging operations in a subsequent charging/discharging step. Because the newly prepared battery unit 10 has a charge capacity larger than that of the battery unit 10a-10e removed as a replacement target, the total charge amount of the power supply device 100 can be maintained. Further, because the battery unit 10a-10e that is determined as the replacement target is excluded from the targets of the charging/discharging operation, the charging operation and the discharging operation can be continued even during the replacement with the new battery unit 10.

In the above-described embodiment, because a portion of the battery units 10a-10e is replaced with the newly prepared battery unit 10, the total charge amount of the entire power supply device 100 can be maintained and stable electric power can be continuously used. Further, because the total charge of the plural battery units 10a-10e is ensured by the battery unit 10 using used battery cells 11-15 of various deterioration degrees, the battery cells 11-15 that have a progressed deterioration degree and a small charge capacity can be effectively utilized.

Second Embodiment

Next, a second embodiment of the present invention is described with reference to FIG. 6 to FIG. 8. Details overlapping with those of the first embodiment are omitted. This embodiment is different from that of the first embodiment in that usage history data of the battery cell is referred for accurately determining the deterioration degree of the battery cell.

Figure 6:
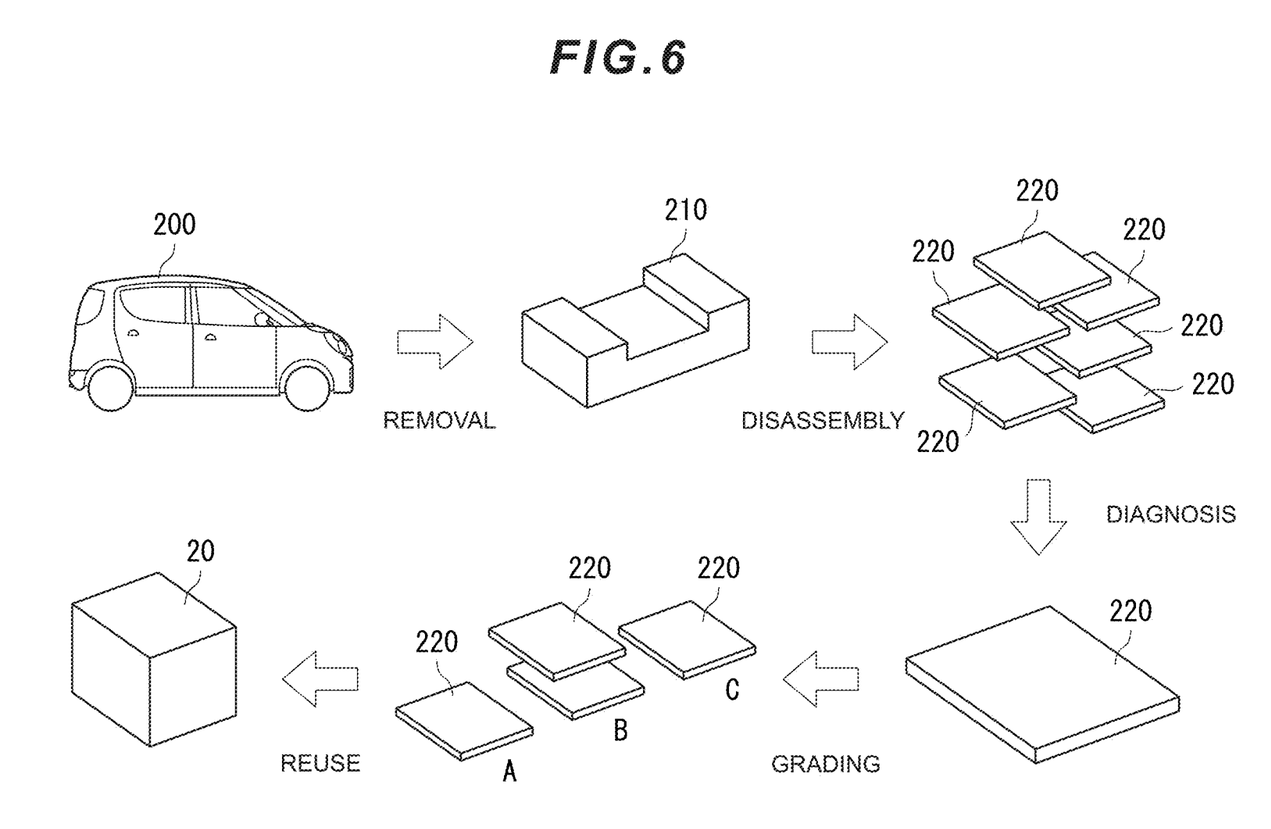
FIG. 6 is a schematic diagram illustrating a battery reuse step according to the second embodiment.

FIG. 6 is a schematic view illustrating a battery reuse step according to this embodiment. In the present embodiment illustrated in FIG. 6, a used battery 210 is removed from a battery using apparatus 200 and plural battery elements 220 included in the used battery 210 are disassembled individually. While a charging or discharging operation is being performed, the deterioration degree of each individual disassembled battery element 220 is calculated by measuring the electrical characteristics of each individual disassembled battery element 220. Based on the calculated deterioration degree, the battery elements 220 are graded into plural ranks and classified into, for example, ranks A to C. The graded battery elements 220 are accommodated in the accommodation part 20 and assembled as a new battery to be used for the power supply device 100. Similar to the first embodiment, the battery elements 220 of the same rank may be connected in series or in parallel to form the battery unit 10a-10e.

The battery using apparatus 200 is an apparatus that is driven by the electric power stored in the secondary battery (cell) such as an electric vehicle or a hybrid car. In the battery using apparatus 200, the usage environment and usage status of the battery being used are recorded as historical data. The data that is recorded as historical data may be, for example, the number of times of charging, the number of times of discharging, the usage environment temperature, the usage hours, and SOH (State of Health). Particularly, with a mobile object such as an electric vehicle, the historical data should preferably include driving history such as travel distance, travel history, the number of times of acceleration, travel speed, and the number of times of brakes.

The used battery 210 has an identification number that is assigned to each individual battery. The historical data and the identification number of the battery using apparatus 200 are associated with each other and recorded in the storage device of the battery using apparatus 200. The used battery 210 includes plural battery elements 220 that are electrically connected to each other. The plural battery elements 220 are collectively controlled as a single cell whose charging and discharging are controlled by the BMS (Battery Management System).

The battery element 220 is an element included in plural in the used battery 210 as a battery unit or a battery cell. Because the battery elements 220 are not provided with an individual BMS, it is preferable to add a new BMS to the battery element 220 for measuring their electrical characteristics and managing their charging and discharging. Further, each battery element 220 is newly provided with identification data for identifying an object. The identification data of each battery element 220 is recorded in association with an identification number assigned to the used battery 210 before its disassembly.

Figure 7:
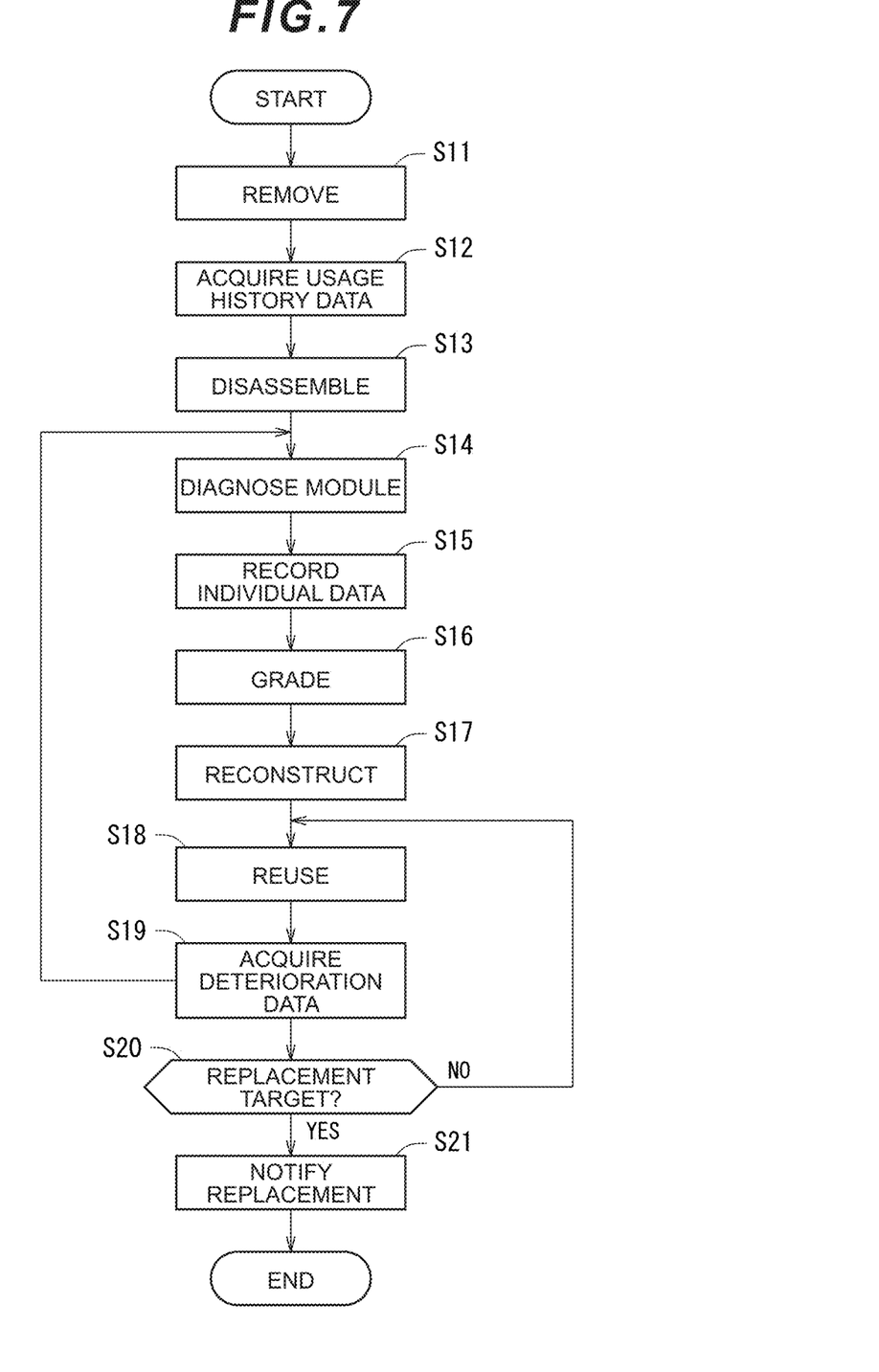
FIG. 7 Is a flowchart illustrating an example of the steps of a battery deterioration degree determination system according to the second embodiment.

FIG. 7 is a flowchart illustrating an example of a procedure of a battery deterioration degree determination system according to this embodiment. FIG. 8 is a block diagram illustrating an example of a configuration of the management server 110 used in the battery deterioration degree determination system according to this embodiment. Although not illustrated in FIG. 8, the management server 110 includes a recording part that records data and a data communication part that performs data communication with the outside. The management server 110 uses a data processing part to perform a data processing operation by executing a program recorded beforehand. Further, an operation program of the management server 110 need not be recorded in the recording part beforehand but may be downloaded from an external device. Further, similar to the first embodiment illustrated in FIG. 5, the management server 110 of this embodiment is data-communicably connected to the power supply device 100 via a network.

Figure 8:
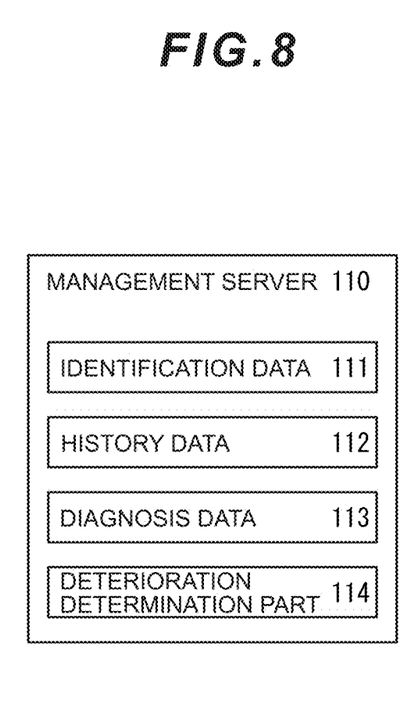
FIG. 8 is a block diagram illustrating an example of a configuration of a management server 110 used in a battery deterioration degree determination system according to the second embodiment.

As illustrated in FIG. 8, the management server 110 has a recording part in which identification data 111, historical data 112, and diagnosis data 113 are recorded and a deterioration determination part 114 that determines deterioration of the battery element 220. The deterioration determination part 114 may be implemented by executing a program by the data processing part of the management server 110 or implemented by an external device that is data-communicably connected to the management server 110 via a network. Further, a measurement device that measures the electrical characteristics of the battery element 220 is provided inside or outside the management server 110. The measurement device transmits the result of the measurement to the management server 110 as measurement data, to thereby provide the measurement function of the deterioration determination part 114.

As illustrated in FIG. 7, in the battery deterioration degree determination system of this embodiment, the used battery 210 is removed from the battery using apparatus 200 in a removing step of step S11. Then, in a usage history data acquisition step of step S12, the historical data of the used battery 210 recorded in the battery using apparatus 200 is acquired. The historical data 112 acquired in the usage history data acquisition step is recorded in the management server 110 in association with the identification number of the used battery 210.

Then, in a disassembly step in Step S13, the used battery 210 is disassembled, and the battery elements 220 included in the used battery 210 are separated individually. At this time, each separated battery element 220 is provided with identification data 111. The identification data 111 of each battery element 220 is recorded in the management server 110 in association with the identification number and historical data 112 of the used battery 210 before its disassembly. Accordingly, the identification data 111 for each battery element 220 and the identification number and historical data 112 of the used battery 210 are associated with each other and recorded in the management server 110. This allows each battery element 220 to be tracked back to the historical data 112 of the used battery 210 and the battery using apparatus 200 prior to the disassembly of the used battery 210.

Then, in a module diagnosis step of step S14, a charging operation or a discharging operation is performed on the battery elements 220 to measure the electrical characteristics of the battery elements 220, so that the deterioration determination unit 114 determines an initial deterioration degree. Here, the electrical characteristics measured in the module diagnosis step corresponds to the first electrical characteristics of the present invention. Further, the initial deterioration degree is the deterioration degree of the used battery 210 in a first stage of being removed from the battery using apparatus 200, which corresponds to the first deterioration degree of the present invention. Further, in a case of measuring the electrical characteristics, it is preferable to add a BMS to each battery element 220 when each battery element 220 is not provided with a BMS.

Then, in an individual data recording step of step S15, the initial deterioration degree determined by the deterioration determination part 114 is included in the diagnosis data 113 and recorded in the management server 110. Further, the historical data 112 of the used battery 210 associated with each battery element 220 is duplicated, and the individual historical data 112 associated with the identification data 111 of each battery element 220 are recorded in the management server 110. Here, the diagnosis data 113 may include, in addition to the initial deterioration degree that is determined, the date and time of the measurement of electrical characteristics, the measurement conditions, and the measurement results. Further, the deterioration determination part 114 records the diagnosis data 113 in association with the identification data 111 and historical data 112 of the battery element 220.

In a module diagnosis step of step S14, in addition to the measured electrical characteristics, the deterioration degree of an initial stage may be determined by referring to the identification data 111 and the historical data 112 recorded in the management server 110. For example, data such as the number of times of charging or discharging, the travel distance, or the like is acquired from the historical data of the used battery 210 in the battery using apparatus 200, and the relation between these data and the deterioration degree is created beforehand as the table data. Thereby, the deterioration degree is determined by referring to the table data. Further, because the management server 110 records the historical data 112 and the diagnosis data 113 with respect to a vast number of battery elements 220, the relation between the historical data 112 and the diagnosis data 113 may be analyzed by machine learning based on the vast amount of data. Thereby, the deterioration degree can be determined according to the analysis.

Then, in a grading step of step S16, the battery elements 220 are classified (classified into classes) according to the deterioration degrees from the diagnosis data 113 recorded in the management server 110. Then, in a reconstruction step of step S17, plural classified battery elements 220 are combined and accommodated in the accommodation part 20 to be reconstructed into a regeneration battery. At this time, the battery elements 220 classified into the same class may be connected in series or in parallel, and the battery elements 220 classified into different classes may be connected in series or in parallel depending on the required voltage. Further, the total of the chargeable capacity of the reconstructed regeneration battery can also be calculated as the sum of the battery elements 220 included in the regeneration battery. Here, the configuration of the power supply device 100 illustrated in the first embodiment can be adopted as that of the regeneration battery, Then, in a reuse step of step S18, the reconstructed regeneration battery is used to perform a discharging operation by supplying electric current to the various loads 91 and perform a charging operation from an external electric power supply or the solar panel 90. After the reuse step is continued for a predetermined period, the procedure proceeds to step S19.

Then, in a deterioration data acquisition step of step S19, the electrical characteristics of the regeneration battery at the time of the charging operation or the discharging operation are measured by using the deterioration measurement part 50 of the power supply device 100 or the deterioration determination part 114 of the management server 110. Here, the electrical characteristics of the regeneration battery correspond to the second electrical characteristics of the present invention. Further, the deterioration measurement part 50 or the deterioration determination part 114 updates the historical data 112 by adding the measured electrical characteristics and the usage history of the regeneration battery until the time of the measurement to the historical data 112. Further, the deterioration measurement part 50 or the deterioration determination part 114 determines the deterioration degree of the battery element 220 again based on the measured electrical characteristics and the updated historical data 112 and updates the diagnosis data 113 of the management server 110 by adding the determined deterioration degree to the diagnosis data 113. Here, the deterioration degree determined again in the deterioration data acquisition step corresponds to the second deterioration degree of the present invention.

As described above, in this embodiment, the historical data 112 and the diagnosis data 113 updated in the deterioration data acquisition step are accumulated in the management server 110 whenever the regeneration battery is used and are used in determining the deterioration degree of the other battery elements 220. Therefore, in the module diagnosis step and the deterioration data acquisition step, the initial deterioration degree is determined by referring to the usage history of the battery using apparatus 200, the electrical characteristics at the time of disassembly of the battery elements 220, and the usage history of the other regeneration batteries. Accordingly, not only is the electrical characteristics at the time of disassembly of the battery units 220 used for determining the deterioration degree, but also big data of the usage history and the electrical characteristics chronologically obtained from the time before the disassembly to the time after the reuse are used. Thus, the deterioration degree can be determined with increased accuracy for predicting how much the regeneration battery reconstructed with the battery elements 220 can be continuously charged or discharged.

Then, in a replacement target determination step of step S20, it is determined whether to replace the battery element 220 using the method illustrated in FIG. 4 of the first embodiment. If the battery element 220 to be the target for replacement does not exist, the procedure proceeds to step S18 to continue the reuse step. If it does exist, the procedure proceeds to step S21. In a replacement notification step of step S21, the battery element 220 to be replaced is notified to the outside of the management server 110 via the network.

As described above, the battery deterioration degree determination system of this embodiment records the identification data 111 of the battery element 220 in association with the historical data 112 used in the management server 110, measures the first electrical characteristic at the time of charging or discharging of the battery element 220, and determines the initial deterioration degree based on the measurement result and the historical data 112. Further, the deterioration determination part 114 records the diagnosis data 113 including the initial deterioration degree in association with the identification data 111 in the management server 110. By determining the deterioration degree based on the electrical characteristics and historical data of the battery element 220, the deterioration degree can be determined accurately because not only is the status of the battery element 220 at the time of measuring the electrical characteristics taken into consideration but also the usage history starting from the time of the manufacture of the battery element 220 is taken into consideration.

Further, the deterioration determination part 114 updates the historical data 112 by measuring the second electrical characteristic at the time of charging or discharging of the battery element 220 after a lapse of a predetermined period, determines the second deterioration degree based on the measurement result of the second electrical characteristic and the historical data 112, and updates the diagnosis data 113 by adding it with the second deterioration degree. Thus, the deterioration degree can be determined with consideration of the usage history of the reconstructed regeneration battery. Thereby, the deterioration degree can be determined with greater accuracy.

Further, the deterioration determination part 114 analyzes the relation between the historical data 112 and the diagnosis data 113 regarding the plural battery elements 220 by machine learning and updates the method of determining the initial deterioration degree and the second deterioration degree based on the result of the analysis. Accordingly, the deterioration degree of the battery element 220 can be determined with greater accuracy by measuring the battery element 220 removed from the battery using apparatus 200, using the reconstructed regeneration battery, and gathering the usage history and the electrical characteristics of the regeneration battery.

The present invention is not limited to the above-described embodiments, and various changes can be made within the scope shown in the claims, and embodiments obtained by appropriately combining the technical means disclosed respectively in the different embodiments are also included in the technical scope of the present invention.

DESCRIPTION OF THE REFERENCE NUMERALS

100 . . . Power supply device
10, 10a-10e . . . Battery unit
20 . . . Accommodation part
30 . . . Control part
40 . . . Connection selection part
50 . . . Deterioration measurement part
60 . . . Unit replacement notification part
70 . . . Charging part
80 . . . Discharging part
90 . . . Solar panel
91 . . . Load
110 . . . Management server
11-15 . . . Battery cell
111 . . . Identification data
112 . . . Historical data
113 . . . Diagnosis data
114 . . . Deterioration determination part
200 . . . Battery using apparatus
210 . . . Used battery
220 . . . Battery element

The invention claimed is:

1. A power supply device for performing charging from a charging part and discharging from a discharging part, the power supply device comprising:
a plurality of battery units including a plurality of battery cells connected in series or in parallel;
a connection selection part configured to select at least one of the battery units to be connected to the charging part or the discharging part;
an accommodation part configured to detachably accommodate each of the battery units;
a deterioration measurement part configured to measure the deterioration degree of the battery cells included in the battery unit;
a unit replacement notification part configured to transmit a unit replacement signal based on a measurement result of the deterioration measurement part;
wherein the plurality of battery cells are classified into a plurality of deterioration ranks according to a deterioration degree for the respective battery cell of the plurality of battery cells, and the battery cells included in one of the battery units have the same deterioration rank,
wherein the unit replacement notification part is configured to transmit the unit replacement signal in a case where a charge capacity of any one of the battery cells is equal to or less than a first threshold value,
wherein the unit replacement notification part is configured to calculate a sum of a chargeable amount of electricity of a plurality of the battery units accommodated in the accommodation part as a total charge amount and transmit the unit replacement signal in a case where the total charge amount is equal to or less than a second threshold value.

2. The power supply device according to claim 1, wherein the connection selection part is configured to exclude the battery unit included in the battery cell having a charging capacity equal to or less than the first threshold value from a selection target.

3. The power supply device according to claim 2,
wherein the unit replacement notification part is configured to calculate a sum of a chargeable amount of electricity of a plurality of the battery units accommodated in the accommodation part as a total charge amount, and transmit the unit replacement signal in a case where the total charge amount is equal to or less than a second threshold value.

4. The power supply device according to claim 2, wherein the deterioration measurement unit is configured to measure the deterioration degree based on electrical characteristics at a time of charging or discharging of the battery unit.

5. The power supply device according to claim 2, wherein a photovoltaic power generating part for generating electricity by light is connected to the charging part.

6. The power supply device according to claim 1,
wherein the unit replacement notification part is configured to calculate a sum of a chargeable amount of electricity of a plurality of the battery units accommodated in the accommodation part as a total charge amount, and transmit the unit replacement signal in a case where the total charge amount is equal to or less than a second threshold value.

7. The power supply device according to claim 6, wherein the deterioration measurement unit is configured to measure the deterioration degree based on electrical characteristics at a time of charging or discharging of the battery unit.

8. The power supply device according to claim 6, wherein a photovoltaic power generating part for generating electricity by light is connected to the charging part.

9. The power supply device according to claim 1, wherein the deterioration measurement unit is configured to measure the deterioration degree based on electrical characteristics at a time of charging or discharging of the battery unit.

10. The power supply device according to claim 9, wherein a photovoltaic power generating part for generating electricity by light is connected to the charging part.

11. The power supply device according to claim 1, wherein a photovoltaic power generating part for generating electricity by light is connected to the charging part.

12. The power supply device according to claim 1, wherein the deterioration measurement unit is configured to measure the deterioration degree based on electrical characteristics at a time of charging or discharging of the battery unit.

13. The power supply device according to claim 1, wherein a photovoltaic power generating part for generating electricity by light is connected to the charging part.

14. The power supply device according to claim 1, wherein a photovoltaic power generating part for generating electricity by light is connected to the charging part.

15. A battery deterioration degree determination system for determining deterioration of a used battery element, the battery deterioration degree determination system comprising:
- a management server configured to record identification data of the battery element in association with usage historical data; and
- a deterioration determination part configured to measure a first electrical characteristic at a time of charging or discharging of the battery element, determine a first deterioration degree based on a measurement result of the first electrical characteristic and the usage history data, and record the identification data in association with diagnosis data including the first deterioration degree in the management server, wherein the deterioration determination part is configured to measure a second electrical characteristic at a time of charging or discharging of the battery element after a lapse of a predetermined period, update the usage history data, determine a second deterioration degree based on a measurement result of the second electrical characteristic and the usage history data, and update the diagnosis data by adding the second deterioration degree to the diagnosis data.

16. The battery deterioration degree determination system according to claim 15, wherein the deterioration determination part is configured to analyze a relation between the usage history data and the diagnosis data regarding a plurality of the battery elements by machine learning, and update a method for determining the first deterioration degree and the second deterioration degree based on a result of the analysis.

* * * * *